Oct. 8, 1940.  G. F. SMITH  2,217,499

POWER SYSTEM

Filed April 18, 1939  2 Sheets-Sheet 1

WITNESSES:
N. F. Susser
Thos Chilcot

INVENTOR
Gerald F. Smith.
BY
G. M. Crawford
ATTORNEY

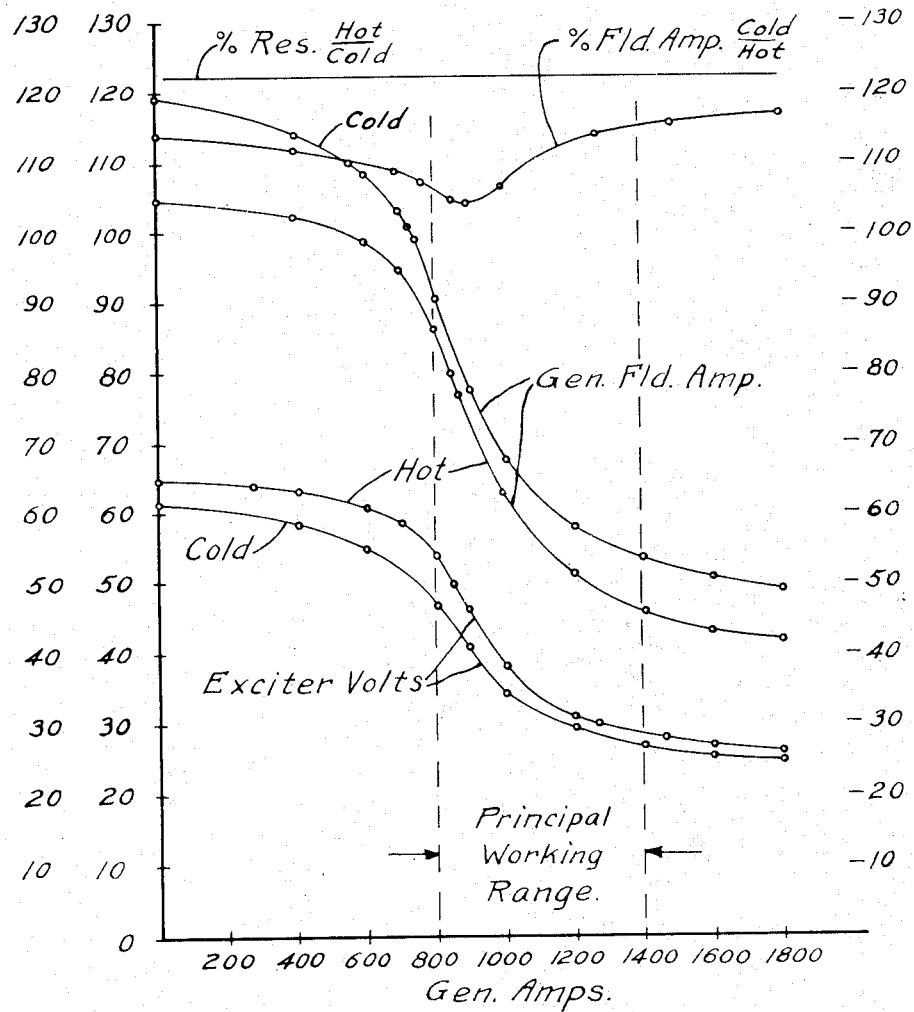

Patented Oct. 8, 1940

2,217,499

UNITED STATES PATENT OFFICE 2,217,499

POWER SYSTEM

Gerald F. Smith, Forest Hills, Pa., assignor to Westinghouse Electric & Manufacturing Company, East Pittsburgh, Pa., a corporation of Pennsylvania Application April 18, 1939, Serial No. 268,553

7 Claims. (Cl. 171—223)

My invention relates, generally, to power systems for self-propelled vehicles and, more particularly, to power systems in which the power is developed by an internal-combustion engine driving a generator which supplies current for operating electric motors to propel the vehicle.

This application is a continuation-in-part of my copending application, Serial No. 108,597, filed October 31, 1936, now Patent No. 2,157,869, issued May 9, 1939, and the present invention constitutes an improvement over the system disclosed in my Patent No. 1,730,340, issued October 1, 1929, in which an engine drives a generator and an exciter for the generator, the exciter having a differential field winding on a portion of its field poles which is energized by the main generator current in order to produce certain operating characteristics in the electrical machines which improve the performance of the Diesel or gas engine. In the system disclosed in my aforementioned copending application, the engine loading characteristics are improved by providing a cumulative field winding on the same field poles of the exciter as the differential winding disclosed in my prior patent. The cumulative field winding is connected in series circuit relation with the exciter armature circuit and causes the torque on the engine to decrease approximately as the square of the speed, thereby maintaining the speed of the engine practically constant. An additional cumulative field winding may be added to each of the field poles of the exciter supporting the usual separately-excited field winding. The additional cumulative field windings are energized by the current in the generator load circuit and are utilized to provide a lower no-load exciter voltage.

While the foregoing power systems have operated fairly satisfactorily on Diesel-electric locomotives, it has been found that there is considerable variation in the characteristics of the machines when operating cold and when operating hot. Since locomotives of this type are frequently utilized for intermittent service in which case the machines become cool while standing idle, it is desirable to avoid such variations in operating characteristics.

An object of the present invention, generally stated, is to provide a power system in which the operating characteristics of the electrical machines are substantially the same whether cold or hot.

A more specific object of my invention is to reduce the effect of the variation of the main generator field resistance caused by changes in the operating temperature of the generator.

Another object of my invention is to reduce the time lag in building up a portion of the field of the exciter for the generator of a power system for self-propelled vehicles.

Other objects of the invention will be explained fully hereinafter or will be apparent to those skilled in the art.

In accordance with one embodiment of the present invention, the additional cumulative field winding, which has been previously added to the same field poles of the exciter as the differential field winding, is connected as a shunt field across the exciter armature instead of in series with the exciter armature and the main generator field winding. In this manner, the effect of the variation in the main generator field resistance due to temperature changes is greatly reduced, and the time lag in building up a portion of the exciter field is also reduced.

For a fuller understanding of the nature and objects of the invention, reference may be had to the following detailed description, taken in conjunction with the accompanying drawings, in which:

Fig. 5 is a set of curves showing operating characteristics of the power system.

Figure 1:
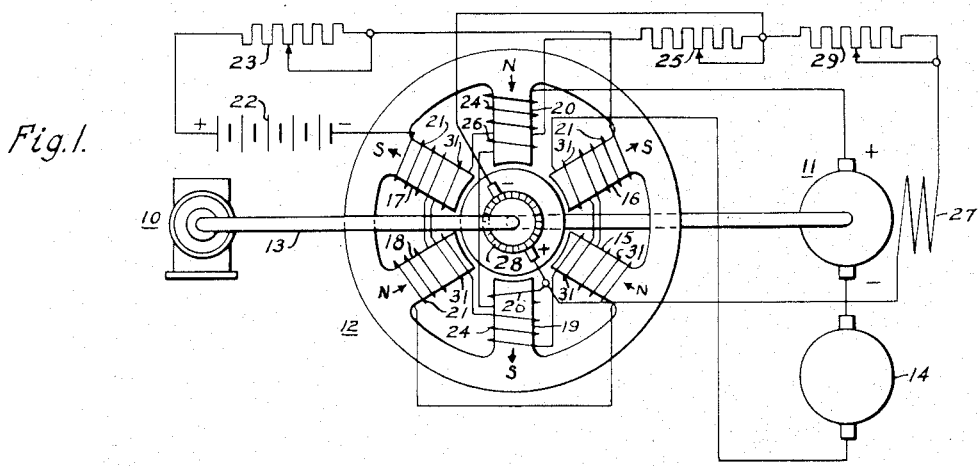
Figure 1 is a diagrammatic view of a power system for self-propelled vehicles, embodying my invention.
Figure 2:
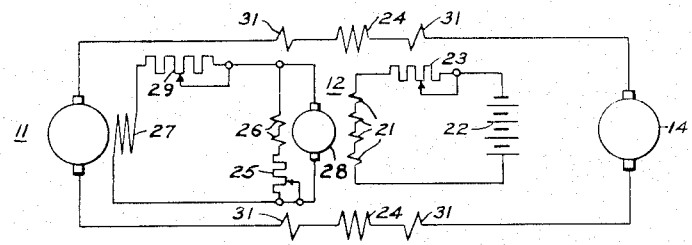
Fig. 2 is a diagram of connections used in the power system.

Referring now to the drawings, and particularly to Figs. 1 and 2, the power system illustrated comprises an internal-combustion engine 10 which drives a generator 11 and an exciter 12 for the generator 11 by means of a shaft 13. The generator 11 may be utilized to furnish power for operating a motor 14 which is suitable for propelling a locomotive or other vehicle (not shown)

As described in my foregoing Patent No. 1,730,- 340, the exciter 12 is provided with a plurality of field poles 15 to 20, inclusive. Four of the field poles 15 to 18 inclusive, are provided with separately excited field windings 21 which may be energized from a battery 22. An adjustable rheostat 23 may be utilized for adjusting the current in the field windings 21. The other two field poles 19 and 20 are provided with differential field windings 24, which are connected in series-circuit relation with the armature of the generator 11 and are energized by the current in the load circuit for the generator.

It will be understood that the field windings 21 and 24 function in the same manner as described in my foregoing patent, the differential field windings 24 opposing the flux established by the field windings 21, thereby causing the exciter to have certain characteristics similar to the exciter utilized in the system of my prior patent.

In order to improve the engine loading characteristics of the system, I have provided another field winding 26 on the field poles 19 and 20. The field winding 26 is a cumulative winding and, therefore, aids the field winding 21 in developing the exciter voltage. The generator 11 is excited in accordance with the voltage developed by the exciter 12, a rheostat 29 being provided for adjusting the generator field current. The addition of the cumulative field winding 26 to the field poles 19 and 20 does not materially change the exciter-voltage generator-amperes characteristic of the machines, which remains practically the same as for the machines described in my prior patent.

However, the torque-speed characteristic of the present machines is affected by the addition of the field winding 26 in the manner described in my aforementioned copending application. In the present instance, the torque decreases approximately as the square of the speed instead of directly as the speed, as in the system described in my prior patent. Therefore, the speed of the engine is maintained practically constant, since with a decrease in engine output and a consequent decrease in engine speed, the torque falls rapidly to minimize the speed decrease by automatically unloading the engine. Since the torque decreases as the square of the speed, the decrease in torque is rapid at high speed and full load where it is most effective in maintaining a predetermined engine speed.

In my aforementioned copending application, the cumulative field winding 26 is connected in series-circuit relation with the field winding 27 of the generator 11, which is connected across the armature 28 of the exciter 12. However, as explained hereinbefore, it has been found that as a result of the effect of the variation of the main generator field resistance caused by temperature changes, the machines have considerably different characteristics when operating cold than they do when operating hot.

In order to reduce the effect of the variation of the main generator field resistance, the cumulative field winding 26 is connected across the armature 28 of the exciter 12 in series with an adjustable rheostat 25, as shown in the present drawings, instead of in series with the armature as in my copending application. In this manner, the field winding 26 is not affected by the change in the resistance of the generator field winding 27, since the winding 26 is no longer in series with this field winding. The winding 26 is, however, energized by the voltage of the exciter 12, and, therefore, functions in the manner described in my copending application to reduce the load on the engine in the event of a drop in the speed and consequently a drop in the voltage of the exciter 12. Furthermore, the time lag in building up the two-pole exciter field by the winding 26 is reduced, since it is independent of the time lag in the main generator field.

As shown by the curves in Fig. 5, which are based on an actual test of machines connected in the manner shown in Figs. 1 and 2, there is relatively small difference over the principal working range of the machines between the generator field current when operating cold and when operating hot. For the particular machine tested, the resistance of the generator field winding was .5 ohm cold and .61 ohm hot, or an increase of 22% in the resistance of the field winding. It will be seen that whereas the increase in hot to cold field resistance was 22%, the change in field current over the principal working range was as low as 4% and varies between 4% and 17%. Thus, it will be seen that, over the principal working range, the machines have substantially the same characteristics when operating hot as when operating cold.

As described in my copending application, a cumulative field winding 31 is added to each of the field poles 15 to 18, inclusive, in addition to the separately excited field winding 21 previously described. The field windings 31 are connected in series-circuit relation with the differential field windings 24 and are energized by the current in the generator load circuit.

The cumulative field windings 31 are utilized to provide a lower no-load exciter voltage. Since the cumulative effect produced by the field windings 31 depends upon the generator load current, it is evident that at no-load the windings 31 produce no flux and, therefore, the exciter voltage is reduced at no-load. The field winding 26 on the field poles 19 and 20 functions in the manner described hereinbefore to decrease the torque on the engine in the event of a decrease in speed, thereby maintaining a predetermined engine speed.

Figure 3:
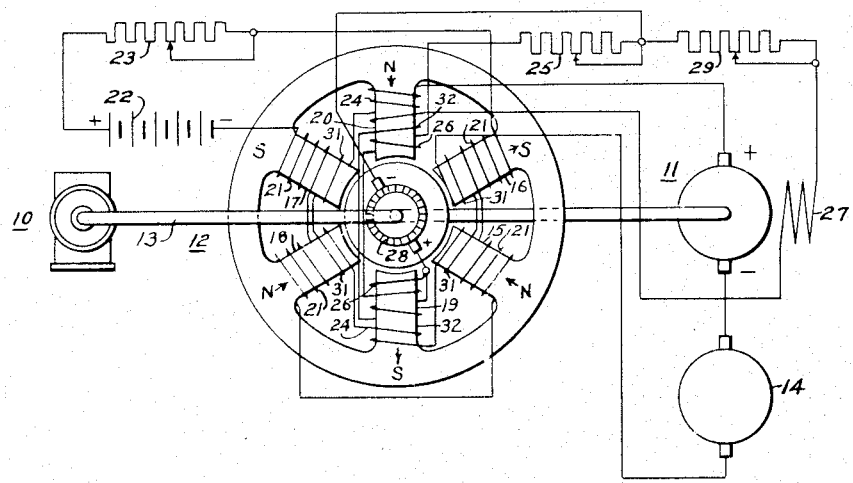
Fig. 3 is a diagrammatic view of a modified form of a power system similiar to the one shown in Fig. 1.
Figure 4:
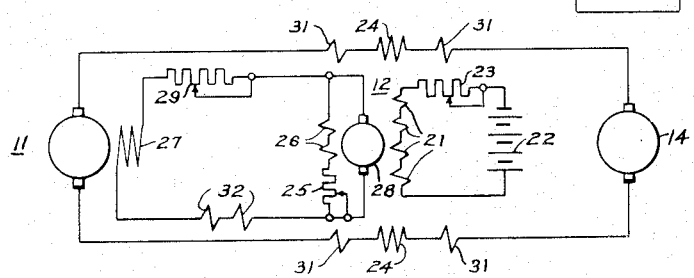
Fig. 4 is a diagram of the connections used in the modification of the invention shown in Fig. 3.

In the modification of the invention shown in Figs. 3 and 4, an additional differential field winding 32 is added to each of the field poles 19 and 20. The differential field windings 32 are connected in series-circuit relation with the armature of the exciter 12 and the generator field winding 21. In order to overcome the effect of the differential field windings 32 under normal load conditions, the cumulative field winding 26 previously described is increased to counteract the effect of the differential field winding 32.

It will be seen that the differential field winding 32 will further reduce the effect of change in resistance of the main generator field, since when the generator is operating cold and the field resistance is low, the differential field winding 32 will reduce the voltage of the exciter, thereby maintaining a more nearly normal generator field current. As the temperature of the generator field increases, the current is maintained at the normal value by the cumulative field winding 26, which, as previously explained, is designed to overcome the effect of the differential field winding 32 under normal operating conditions.

From the foregoing description, it is evident that in the systems described in the present application all of the advantages provided by the systems disclosed in my copending prior application are retained, and that the present systems provide the additional advantages of reducing the effect of variation in the main generator field resistance resulting from temperature changes, and also the time lag in building up a portion of the exciter field is reduced by utilizing the connections herein described.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the other portions of the field poles of the exciter and energized by the current in said generator load circuit, and a cumulative field winding connected across the exciter armature winding.

2. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, and a cumulative field winding connected across the exciter armature winding.

3. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, and a cumulative field winding disposed on the same poles as the differential field winding and connected across the exciter armature winding.

4. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, a cumulative field winding disposed on the same poles as the differential field winding and connected across the exciter armature winding, and an additional cumulative field winding disposed on the same poles as the separately excited winding, said additional winding being energized by the current in the generator load circuit.

5. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, a cumulative field winding disposed on the same poles as the differential field winding and connected across the exciter armature winding, and an additional differential field winding connected in series-circuit relation with the exciter armature winding.

6. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, a cumulative field winding disposed on the same poles as the differential field winding and connected across the exciter armature winding, an additional cumulative field winding disposed on the same poles as the separately excited winding, said additional winding being energized by the current in the generator load circuit, and an additional differential field winding connected in series-circuit relation with the exciter armature winding.

7. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, a cumulative field winding disposed on the same poles as the differential field winding and connected across the exciter armature winding, an additional cumulative field winding disposed on the same poles as the separately excited winding, said additional winding being energized by the current in the generator load circuit, and an additional differential field winding disposed on the same poles as the first-named differential winding and connected in series-circuit relation with the exciter armature winding.

GERALD F. SMITH.